Figure 3:
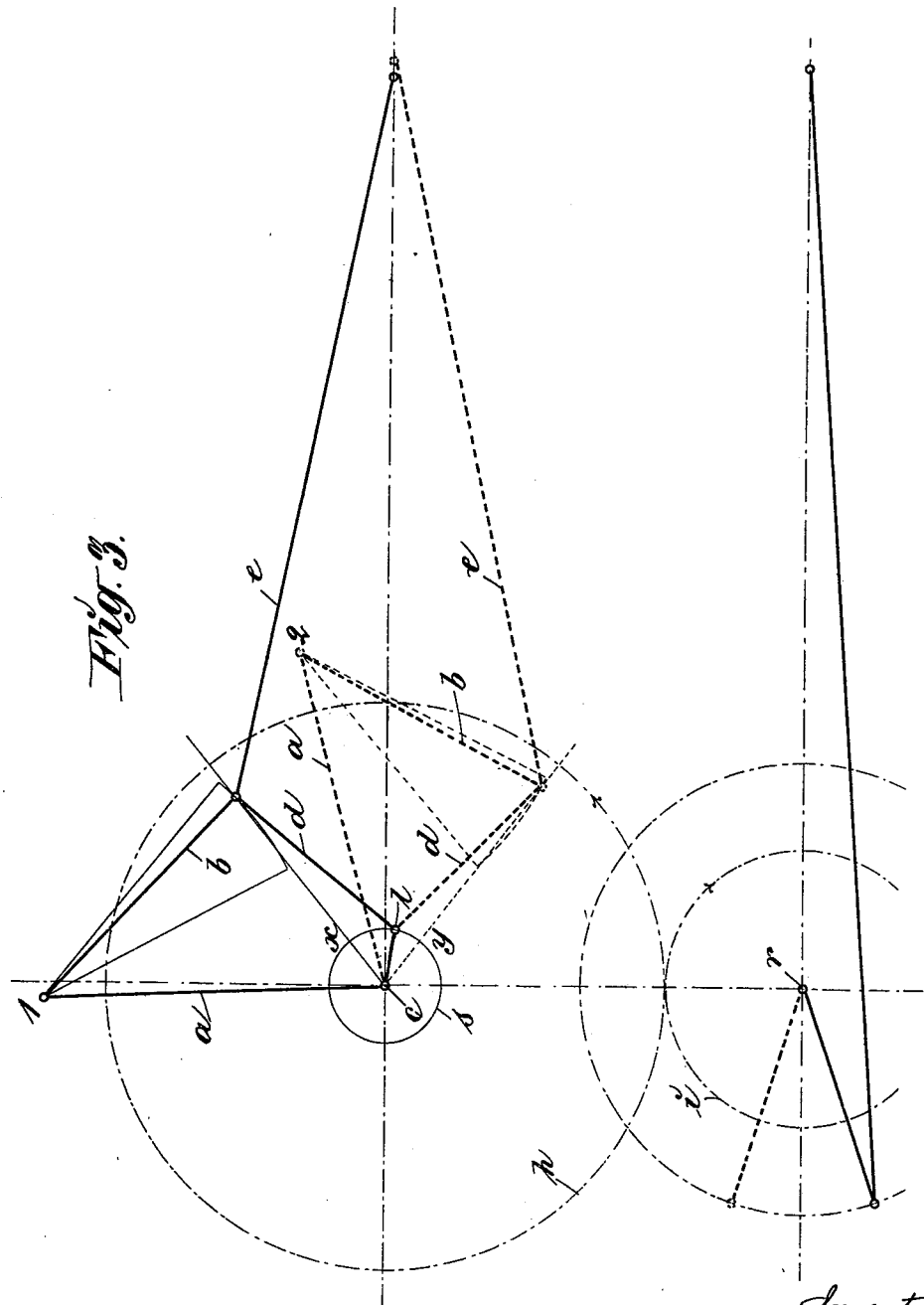

No. 672,202. Patented Apr. 16, 1901.
H. A. BERTHEAU.
VALVE GEAR FOR EXPLOSIVE ENGINES.
(Application filed Jan. 30, 1899.)
(No Model.) 3 Sheets—Sheet 1.
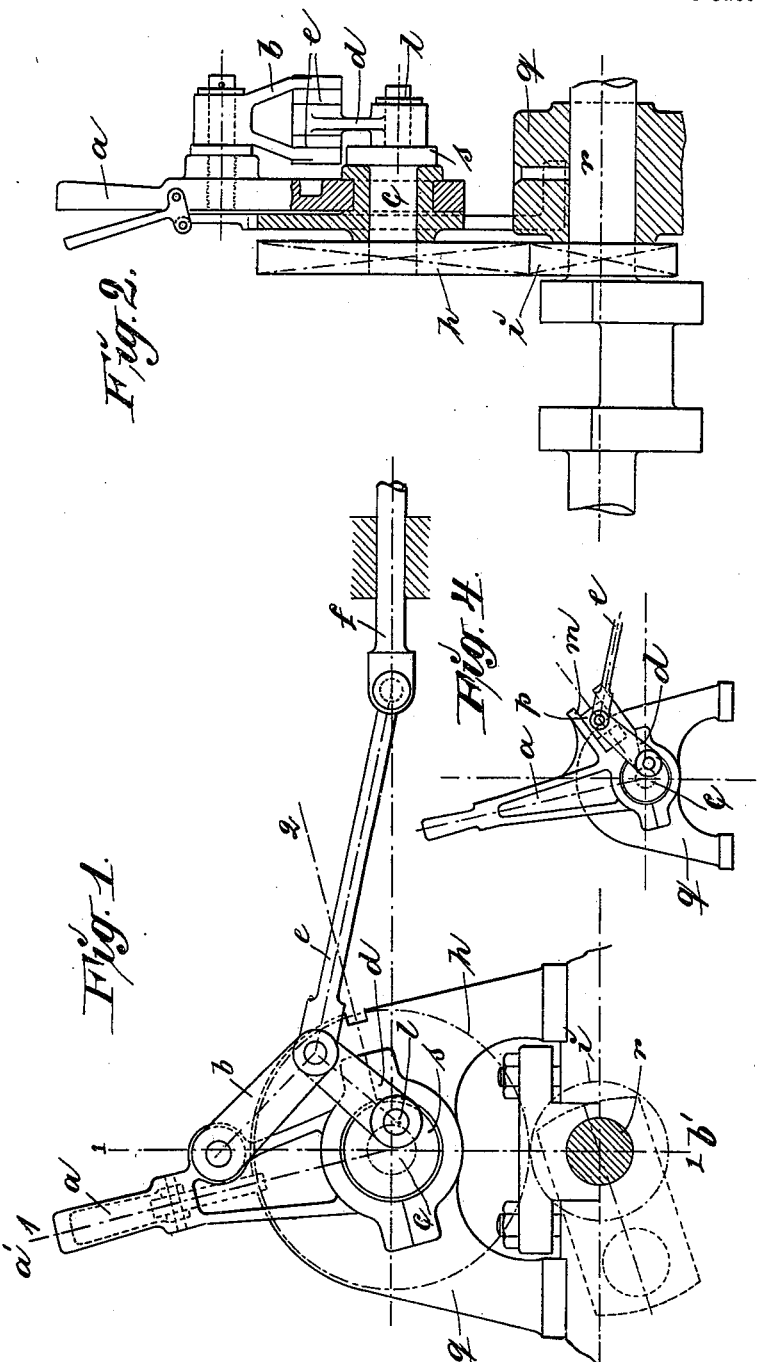

No. 672,202. Patented Apr. 16, 1901.
H. A. BERTHEAU.
VALVE GEAR FOR EXPLOSIVE ENGINES.
(Application filed Jan. 30, 1899.)

(No Model.) 3 Sheets—Sheet 2.

Witnesses:
Inventor:
Henrik August Bertheau.
by
Atty.

No. 672,202. Patented Apr. 16, 1901.
H. A. BERTHEAU.
VALVE GEAR FOR EXPLOSIVE ENGINES.
(Application filed Jan. 30, 1899.)
(No Model.) 3 Sheets—Sheet 3.
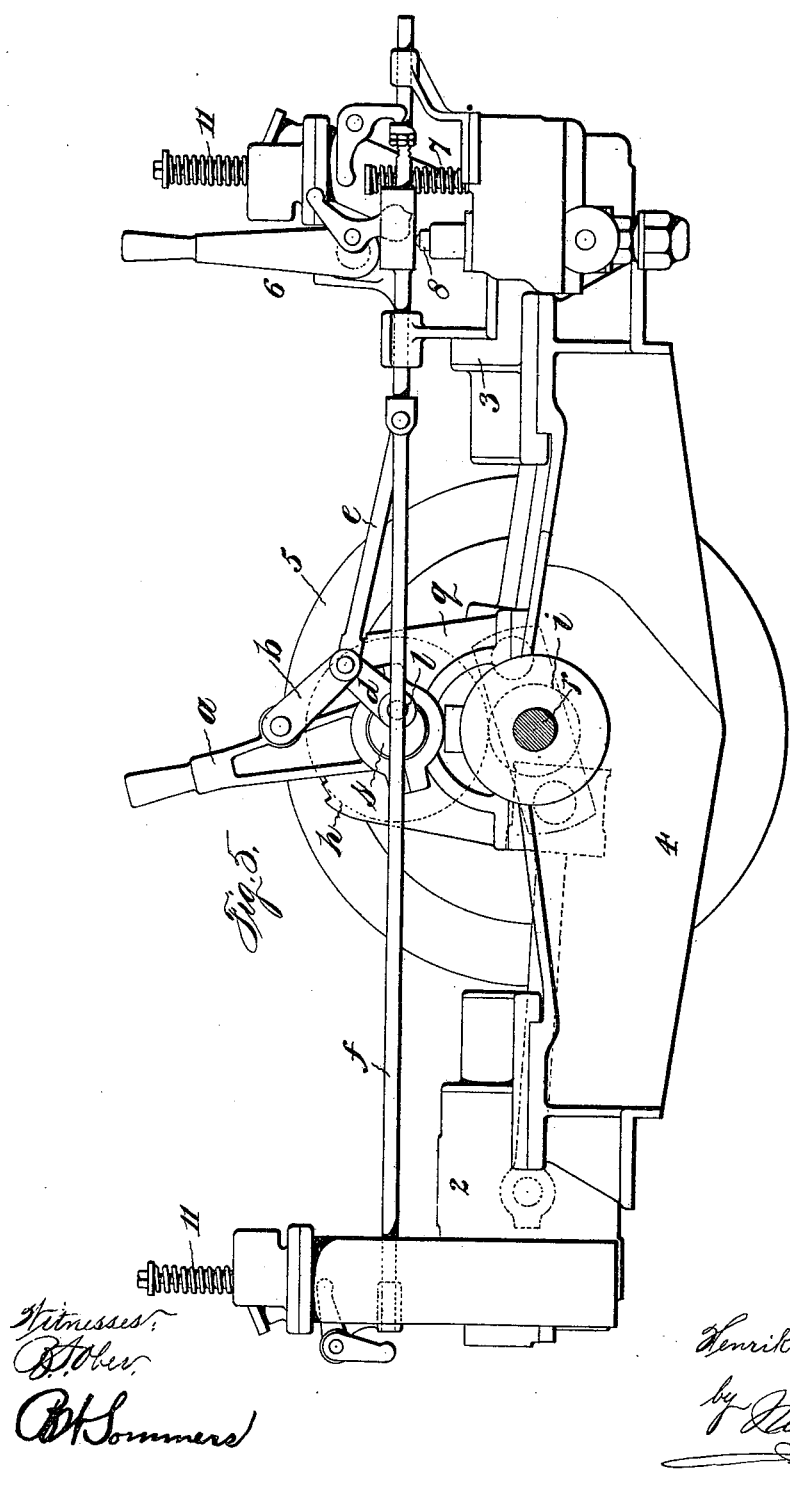

even when

UNITED STATES PATENT OFFICE.

HENRIK AUGUST BERTHEAU, OF STOCKHOLM, SWEDEN.

VALVE-GEAR FOR EXPLOSIVE-ENGINES.

SPECIFICATION forming part of Letters Patent No. 672,202, dated April 16, 1901.

Application filed January 30, 1899. Serial No. 703,931. (No model.)

*To all whom it may concern:*

Be it known that I, HENRIK AUGUST BERTHEAU, engineer, of Flemminggatan No. 47, Stockholm, Sweden, have invented certain new and useful Improvements in Devices for Reversing the Rotary Direction of Gas and Petroleum Engines; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention has relation to reversing-gear for engines, and more particularly to reversing-gear for hydrocarbon and similar motive-fluid engines.

The object of this invention is to simplify the construction of reversing-gearing by materially reducing the number of the operative parts and by so arranging and combining the same that the gear-wheel through which motion is imparted to the valve-rod from a gear on the power-shaft instead of being displaced in reversing revolves on a fixed pivot.

That my invention may be fully understood, I will describe the same in detail, reference being had to the accompanying drawings, in which—

Figure 1 is an elevation, partly in section, of my improved reversing-gear. Fig. 2 is a transverse sectional view thereof. Fig. 3 is a diagram illustrating the position of parts during the rotation of the crank-shaft in opposite directions. Fig. 4 is an elevation illustrating a structural modification; and Fig. 5 shows two gas-engines on a common bed equipped with valves, as shown and described in Letters Patent granted to me August 14, 1900, No. 655,751, and one of said engines is also provided with a starting mechanism, as shown in said patent, with the reversing mechanism applied so as to operate both engines.

As shown in Fig. 5, the reversing-gear is applied to a pair of explosive four-stroke cycle gas-engines 2 3, mounted on a base 4, conforming to lines of a boat they are designed to drive by means of the propeller-shaft $r$, said shaft being provided with a fly-wheel 5. The starting mechanism is designated by 6, and the exhaust-valve by 7. 8 is the valve controlling gas under pressure, and 9 and 10 bell-crank levers, all of which operate and perform their functions as described in the above-mentioned patent. Air is drawn in through spring-controlled air-inlet valves 11.

From the engine base or framing and straddling the crank-shaft $r$ rises a standard $q$, in which a spindle $c$ has its bearings, and on said spindle $c$ is secured a gear-wheel $h$, meshing with a like wheel $i$, secured to the power-shaft $r$ of the engine. On the spindle $c$ is secured a crank-disk $s$, and on the bearing for said spindle is loosely mounted the reversing-lever $a$, whose locking-arm is adapted to move over a notched sector preferably formed integral with the standard $q$, as shown in Fig. 2.

To the wrist-pin $l$ of the disk $s$ is pivoted one end of a link $d$, the other end of which is pivoted to one end of a connecting-rod $e$, whose opposite end is pivotally connected with the valve-operating rod $f$ in the usual manner, and a link $b$ is pivotally connected with the reversing-lever $a$ and with the pivotal connection of the link $d$ and connecting-rod $e$, as plainly shown in Fig. 1, which shows the parts in their normal position, in which position said parts are also shown in full lines diagrammatically in Fig. 3.

In the described arrangement it will be observed that the pivotal point of the links $b$ $d$ and connecting-rod $e$ oscillates during the rotation of the crank-disk $s$ in substantially a radial line through the points $c$ $x$, the connecting-rod $e$ moving in a vertical plane and imparting a reciprocating movement in a horizontal plane to the valve-operating rod $f$. As shown in Fig. 4, said pivotal point of the links $b$ $d$ and rod $e$ may be caused to move in substantially a radial line by providing the reversing-lever $a$ with a longitudinally-slotted radial arm $m$, whose slot forms a guide for a slide-block $p$, that carries the pivot-pin for the link $d$ and rod $e$, said arm $m$ taking the place of the link $b$. It will further be observed that during the movements of the reversing-lever the point of connection between the rod $e$ and link $d$ will describe an arc of a circle having for center the wrist-pin $l$, thus insuring an easy motion of the latter and of the parts operated thereby.

I have hereinbefore stated that the valve-controlling mechanism is shown in its normal position in Fig. 1 and in full lines in the diagram Fig. 2, the gears $h$ and $i$ revolving in the direction of the arrow-heads thereon. If the reversing-lever $a$ is now shifted from its position 1 (shown in full lines in said diagram) to the position 2, (shown in dotted lines,) the position of the link $d$ and rod $e$ will be shifted from one side of a line extending from the valve-operating rod and intersecting the axis of rotation of the spindle $c$ to the opposite side of said line, thereby reversing the operation of the valve, causing the power-piston to reverse the rotation of the power-shaft, as will be readily understood, the proportion of the gear-wheels $i$ and $h$ being of course as one to two.

It is readily seen from Fig. 3 that, as shown in full lines, the valve-rod $e$ is moving toward the right, because $d$ and $c\,l$ are at an angle and are coming into alinement.

This device being shown in connection with a four-stroke cycle-engine, let us say that in this quadrant (that through which the pin $l$ is about to move) the exhaust-valve will be operated and the piston will move from left to right. In the second quadrant the valve-rod will nearly complete its stroke, as is evident from the diagram, while the piston is moving from right to left and taking in gas from a gas-port. In the third quadrant the valve completes its stroke and begins its return stroke, and the piston moves for a second time from left to right, compressing the charge. In the last quadrant the valve nearly completes its return while the piston is forced from right to left by the explosion of the charge. The valve now completes its return and begins its forward stroke, meanwhile operating the exhaust. The piston moving from left to right exhausts the spent gases. Now in order to reverse, the wheels $h$ and $i$ must necessarily travel in a contrary direction to that indicated, and it is readily seen that if the lever $a$ were not moved and we are to open the exhaust-valve in the first quadrant of revolution of the pin $l$, as in the above-described cycle, it could not be done, because the valve would be part way on its stroke (to left $d$ and $l\,c$, making a decreasing angle) instead of moving to the right to operate the exhaust-valve. Now to remedy this and operate the valve at the proper period we throw the lever $a$ into position 2, so that $d$ and $l\,c$ make an increasing angle and tend to come into alinement. The fourth quadrant of the above-described circle will now become the first for reverse running, and the valve-rod, by reason of the new position of the operating parts, will, as before, be moved to the right and begin its stroke, while the piston moves from left to right to exhaust; nearly complete the stroke of the valve-rod in the second quadrant while the piston takes gas and moves from right to left; complete the stroke of the valve-rod and begin the return in the third quadrant while the piston is compressing its charge; nearly completing its return stroke in the fourth quadrant while the piston is forced out by the explosion of the charge, and completing its return and beginning the second stroke of the valve-rod, meanwhile operating the exhaust-valve.

Having thus described my invention, what I claim as new therein, and desire to secure by Letters Patent, is—

In a reversing mechanism, the combination with the power-shaft, a transmitting-gear thereon and a valve-operating rod, of a crank-disk, a wrist-pin thereon and a gear on the spindle of the crank-disk meshing with the first-mentioned gear, a reversing-lever loose on the spindle of said crank-disk and provided with a slotted radial arm, a slide-block having motion in said slotted arm, a connecting-rod connecting the valve-operating rod with said block, and a link connecting the latter with the wrist-pin, substantially as set forth.

In testimony that I claim the foregoing as my invention I have signed my name in presence of two subscribing witnesses.

HENRIK AUGUST BERTHEAU.

Witnesses:
  TH. TRAWRINSKY,
  M. GENBERG.